United States Patent [19]

Galloway et al.

[11] Patent Number: 5,940,492
[45] Date of Patent: Aug. 17, 1999

[54] GLOBAL TITLE TRANSLATION IN A TELECOMMUNICATIONS SIGNALLING NETWORK SUPPORTING LOCAL NUMBER PORTABILITY

[75] Inventors: James Robertson Galloway, Scone; Douglas John Carson; Salih Kabay, both of Edinburgh; Peter John Mottishaw, South Queenferry, all of United Kingdom

[73] Assignee: Hewlett-Packard Company, Palo Alto, Calif.

[21] Appl. No.: 08/803,052

[22] Filed: Feb. 19, 1997

[30] Foreign Application Priority Data

Jul. 30, 1996 [GB] United Kingdom .................. 9616003
Oct. 25, 1996 [GB] United Kingdom .................. 9622240

[51] Int. Cl.$^6$ ................................................. H04M 3/42
[52] U.S. Cl. ........................... 379/230; 379/207; 379/220
[58] Field of Search ........................ 379/201, 207, 379/211, 212, 219, 220, 221, 229, 230

[56] References Cited

U.S. PATENT DOCUMENTS

| 5,293,376 | 3/1994 | White ........................................ 370/258 |
| 5,481,603 | 1/1996 | Gutierrez et al. ........................ 379/201 |
| 5,583,914 | 12/1996 | Chang et al. ............................ 379/230 |
| 5,586,177 | 12/1996 | Farris et al. ............................. 379/230 |
| 5,592,530 | 1/1997 | Brockman et al. ....................... 379/34 |
| 5,598,464 | 1/1997 | Hess et al. ................................ 379/230 |
| 5,640,446 | 6/1997 | Everett et al. ........................... 379/230 |
| 5,694,463 | 12/1997 | Christie et al. .......................... 379/207 |
| 5,696,816 | 12/1997 | Sonnenberg ............................ 379/207 |
| 5,703,939 | 12/1997 | Bushnell .................................. 379/207 |
| 5,708,702 | 1/1998 | De Paul et al. .......................... 379/207 |
| 5,740,239 | 4/1998 | Bhagat et al. ............................ 379/207 |
| 5,748,724 | 5/1998 | Sonnenberg ............................ 379/207 |

FOREIGN PATENT DOCUMENTS

| 0 708 570 A2 | 4/1996 | European Pat. Off. . |
| 0 710 042 A2 | 5/1996 | European Pat. Off. . |
| 2 299 913 | 10/1996 | United Kingdom . |

*Primary Examiner*—Krista Zele
*Assistant Examiner*—Scott Wolinsky

[57] ABSTRACT

A method is disclosed that avoids the need to enlarge the translation tables held by Signal Transfer Points (STPs), for the purpose of effecting global title routing of certain signalling messages to enable number portability. Signalling links are monitored to detect messages needing to be routed by global title; the global title of each such message is then checked to see if it relates to a ported number and if this is the case, the global title is modified to a number that will result in the appropriate routing of the message on the basis of the existing translation tables of the STPs.

9 Claims, 8 Drawing Sheets

GLOBAL TITLE TRANSLATION IN A TELECOMMUNICATIONS SIGNALLING NETWORK SUPPORTING LOCAL NUMBER PORTABILITY

TECHNICAL FIELD

The present invention relates to a method and apparatus for facilitating global title translation in a telecommunications signalling network supporting number portability. The present invention has particular application to telecommunication signalling networks operating substantially in accordance with Signalling System No.7, whether as specified by the ITU-TS (formerly CCITT), ANSI, ETSI (for GSM), Bellcore or similar body, such a network being herein referred to as an SS7 network. The CCITT Signalling System Number 7 is specified in Recommendations Q.700–Q.716 CCITT Volume VI—Fascicle VI.7, Geneva 1989, ISBN 92-61-03511-6 which is herein incorporated by reference.

BACKGROUND OF THE INVENTION

Signalling in Modern Telecommunications Systems

In modern switched telecommunication systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentioned Signalling System No. 7 (SS7) which is extensively deployed for control of telephone and other data transmission networks. An SS7 network basically comprises various types of signalling points, namely, signalling end points (SEPs) and signalling transfer points (STPs) interconnected by signalling links, the SEPs being associated for example with respective service switching points (SSPs) of the transmission network, and with service control points (SCPs).

Referring to FIG. 1, an SS7 network 10 is shown intercommunicating three signalling end points constituted by two service switching points SSPs 11 (between which extend speech circuits 12 of a transmission network not further illustrated) and a service control point SCP 13. The SCP serves to implement particular services (sometimes called IN, or Intelligent Network, services) in response to service requests received from an SSP, such a service request being generated by an SSP upon certain trigger conditions being met in the SSP in respect of a call that it is handling. A typical service may involve the translation of the dialer number (called party number) to a different number, the SCP returning this latter number to the SSP to enable the latter to complete call setup.

The SS7 network 10 includes two pairs 14 of signalling transfer points STPs, and a plurality of link sets 18 interconnecting the SSPs, SCP and STPs into a redundant network. Each signalling link set 18 is made up of one or more individual signalling links, the number of signalling links in a link set being chosen to provide appropriate capacity for the level of signalling traffic expected. The redundancy provided in respect of the STPs and links is to ensure that the failure of a single component of the network core does not cause the whole network to fail.

It should be noted that an SS7 network will typically comprise more STP pairs, SSPs and SCPs than illustrated. Service control functionality, as well as being provided in an SCP, can be provided in an Adjunct directly connected to an SSP.

Messages traversing the links of the network may be any of a large number of different types, depending on the nature of the call to which the message relates and the function specified by the message.

The SS7 Architecture

In order to facilitate an understanding of the present invention, a brief review will be given of the layered structure of the SS7 architecture and of the messages passed over the links of the network 10 to implement the SS7 architecture.

FIG. 2 illustrates the SS7 architecture. Levels 1 to 3 (referenced 21, 22, 23) form the message transfer part (MTP) 24. The MTP 24 is responsible for transferring signalling information between signalling points in messages. Level 4 (not referenced as a whole) comprises circuit-related user parts, namely ISDN User Part (ISUP) 26 and Telephone User Part(TUP) 27. These user parts define the meaning of the messages transferred by the MTP 24 and provide functionality to the users of SS7 (block 29). The user parts 26 and 27 are specific to particular types of circuit-related applications as indicated by their names. In fact, the ISUP is the most important user part, the TUP being a subset of ISUP and having been largely replaced by the latter. Most inter-exchange signalling (such as between SSPs 11 in FIG. 1) is circuit-related signalling using ISUP messages.

As well as the circuit-related user parts, SS7 level 4 also includes functional elements defining a general protocol for non-circuit-related information, such as operations, maintenance and administration information or network database information. The main functional element in this Level 4 protocol is the Transaction Capabilities (TC) 30 which sits on top of a Signalling-Connection-Control Part (SCCP) 31 and beneath a TC Users element 32.

The SCCP 31 actually forms part of the transfer mechanism for non-circuit-related applications, combining with MTP 24 to provide transfer mechanisms (both connection-less and connection oriented) meeting the Open Systems Interconnection (OSI) Layer 3/4 boundary requirements. TC 30 itself comprises two elements, namely an intermediate-services part (ISP) and a transaction-capabilities application part (TCAP); ISP is only used for connection-oriented services. Users of the SCCP/TC stack include the INAP (Intelligent Network Application Part) 32 and MAP (Mobile Application Part) 33. With reference to FIG. 1, messages passed between an SSP 11 (FIG. 1) and SCP 13 will be INAP messages using SCCP/TC (in fact, such messages are generally concerned with real time query/response transactions for which a connectionless service is most appropriate so that only the TCAP part of TC is used). Non circuit-related inter-exchange signalling also use SCCP/TC messages; for example, to implement a callback-when-free service, the originating and destination exchanges may exchange SCCP/TC messages. It should also be noted that ISUP may use the SCCP for certain messages.

Considering the MTP 24 in a little more detail, Level 1 (reference 21) defines the physical, electrical and functional characteristics of the transmission path for signalling. MTP Level 2 (reference 22) defines the functions and procedures for the transfer of signalling messages over a link between two directly-connected signalling points. MTP Level 3 (reference 23) provides functions for the reliable transfer of signalling information from one signalling end point to another. Thus, Level 3 is responsible for those functions that are appropriate to a number of signalling links, these being separable into signalling-message handling functions and signalling-network management functions.

When considering the passing of messages over a single link, it is the combination of Levels 1 and 2 that provides for the reliable transfer of signalling information. The Level 2 functions provide a framework in which the information is transferred and performs error-detection and error-correction processes; the Level 2 functions are carried out afresh on a link-by-link basis. At Level 2, information is seen as being transferred between signalling points in messages known as "signal units".

The general form of a signal unit 40 is shown in FIG. 3. As can be seen, a field 41 carrying message/data is encapsulated in a Level 2 framework comprising the following fields: a flag field; a backward sequence number field (BSN); a backward-indicator bit (BIB); a forward sequence number field (FSN); a forward-indicator bit (FIB); a length indicator field (LI); a spare field (SP); a check field; and a terminating flag field. The FSN, FIB, BSN, BIB and check fields provide error correction functionality at link level in a manner well understood by persons skilled in the art.

There are three types of signalling unit:

MSU—the Message Signal Unit—MSUs carry all service/application data sent on the SS7 network. The amount of data per MSU is limited to 273 octets maximum.

LSSU—the Link Status Signal Unit—LSSUs carry information relating to the status of the link and are therefore concerned with Level 2 functions. Normally, LSSUs are only seen during the initial alignment procedure when a link is brought into service but are used at other times, for example, to stop the flow of signal units when processors are busy.

FISU—the Fill-In Signal Unit—When no MSUs or LSSUs are to be sent, a signalling point continually sends FISUs. FISUs carry basic Level 2 information only, for example, the acknowledgement of the last MSU (field 41 is empty).

The length indicator (LI) within each message indicates the signal unit type as follows: LI=0 means FISU; LI=1 or 2 means LSSU; and LI=3 or more means MSU.

Each MSU carries a service information octet SIO and a signalling information field. The SIO field includes a Service Indicator sub-field that defines the user part or equivalent appropriate to the message. The SIF contains the information being transferred and will generally include a routing label 43 comprising a destination point code (DPC) indicating the destination signalling end point, an originating point code (OPC) indicating the originating signalling end point, and a signalling link selection field for specifying a particular link in cases where two signalling points are linked by a multiple-link link set. The MTP 24 is not aware of the contents of the SIF other than the routing label.

SCCP Messages With Global Titles

Of interest to the present invention are certain of the messages using the SCCP. Each SCCP-level message is encapsulated in the SIF field of an MSU as is illustrated in FIG. 3. As well as the routing label 43 described above, an SCCP message comprises a message type field 45 and a number of parameters organised into three parts 46, 47, 48 according to type. Mandatory parameters of fixed length are placed in the mandatory fixed part 46. Mandatory parameters of variable length are placed in the variable mandatory part 47. Optional parameters are placed in the optional part 48.

The SCCP messages of particular interest to the present invention are those that include additional addressing information in the form of a global title; where a global title is present, it will be contained in a Called Party parameter. This parameter is included in Connection Request SCCP messages and all connectionless SCCP messages. By way of example, the connectionless Unitdata message will now be briefly described with reference to FIG. 4, the Unitdata message type being that used for service requests to SCPs as well as for other transaction-oriented message exchanges (including switch-to-switch service requests). In a Unitdata message, apart from the message type, the only mandatory fixed parameter is the protocol class parameter (in this case indicating that a connectionless service is required). The mandatory variable part comprises three parameters Called Party Number 50, Calling Party Number 51 and Data 52, the starts of these parameters being indicated by pointers placed at the beginning of the mandatory variable part. It is the Data parameter 52 that carries the message data. There are no optional parameters (and thus no optional part 48) in a Unitdata message.

The Called Party Number parameter 50 contains addressing information additional to that contained in the routing label 43. Parameter 50 comprises an address portion 53 including one or more address elements, and an address indicator portion 54 with information about the contents of the address portion 53. The address elements that may be included in the address portion 53 are a signalling point code 55 indicating the final destination signalling point of the message, a subsystem number 56 indicating the destination functional entity for the message at the destination signalling point, and a global title 57 generally in the form of a telephone number compliant with a particular numbering plan. The address indicator portion comprises a point code indicator (PC IND) indicating the presence or absence of the address element 55, a subsystem number indicator (SSN IND) indicating the presence or absence of the address element 56, a global title indicator indicating the presence or absence of the address element 57 and its contents if present, and a routing indicator (RTG IND) indicating whether routing is to be carried out on the basis of the global title or on the basis of the destination point code in the MTP routing label and the subsystem number address element 56.

As indicated by its name, a global title identifies a destination globally within the telecommunications system concerned. The global title address element 57 in its simplest form illustrated in FIG. 4, comprises a nature of address indicator 58 and the global title address 59 itself; the indicator 58 serves to indicate whether the global title is a subscriber number, a national significant number or an international number. The global title address element 57 may also include translation type, numbering plan and encoding scheme information.

When an SCCP message is routed through the signalling system, the point code of the final destination may not be known to the sending entity but may need to be determined along the way from the global title information contained in the message (assuming the latter is of a type including the Called Party parameter with global title information). In this case, the message must be routed in two or more hops at the MTP routing level; in other words, the message is, for example, initially sent with the MTP DPC (destination point code) set to indicate an STP that has a gateway role between the originating and destination local exchange carriers, and then the DPC is changed at the STP to the point code of the next hop destination (which may be the intended final destination). The identity of the final destination is contained in the SCCP global title and in order to correctly forward on the SCCP message, the STP must carry out a global title translation to derive the required DPC for the next MTP hop; this translation is generally done by means of a lookup table. The size of the required lookup table will depend on the number of digits of the global title that need to be considered. Thus, for example, in the USA although the national numbering plan is based on ten digits, the organisation and significance of these digits has in the past meant that global title translation typically needed take account of the first six digits only. More particularly, the first three digits indicate the local exchange carrier (LEC), the second three the LEC switch (or other resource) concerned, and the final four digits indicate a particular subscriber line of the indicated LEC switch. Because SCCP messages are intended for a resource such as a switch rather than a particular subscriber line (though, of course, they may relate to such a line), the last four digits of the ten digit global title could in the past be disregarded for the purposes of global title translation; indeed, generally only the first six digits were used for the global title.

However, with the advent of local number portability, the issue of global title translation has become more complex as identification of the destination resource may need all ten digits (in the case of the US numbering plan) of the global title as will be more fully explained below. The present invention is concerned with global title translation in systems supporting local number portability. In order to further place the present invention appropriately in its context, a short description will next be given of local number portability.

Local Number Portability

Local Number Portability (LNP) has become a regulatory requirement in the USA. LNP is intended to allow subscribers to move between LECs (Local Exchange Carriers) whilst retaining their existing telephone numbers, within a rating area.

AT&T has proposed an LNP solution using a Location Routing Number (LRN). This solution relies on switched-based triggers to reference service control functionality in standard manner. The solution requires modification to the ISUP IAM message to add in a Generic Address Parameter (GAP) and a Forward Call Indicator (FCI). The general operation of the LRN number portability proposal will become clear from the following description given with reference to FIG. 5.

In FIG. 5, party A is connected to switch EO1 of carrier C1 ("EO" standing, of course, for "End Office"). Party B was previously connected to switch EO2 of carrier C1 but has now ported (moved) to carrier C2 and is currently connected to switch EO3 of carrier C2. Before B ported to carrier C2, B's number was "708-444-1234", the "708-444" part of this number indicating the switch; when A dialled B, the switch EO1 simply routed the call direct to switch EO2 based on the "444" part of the dialled number. After B has ported, B is connected to switch EO3 which is identified by "708-555". The objective of number portability is to enable A to continue to dial B using the number "708-444-1234" (it being appreciated that the "708" part of the number will not need to be dialled by A). The operations that follow the dialling of "444-1234" by A will now be described, these operations being indicated by bracketed reference numbers in FIG. 5:

(1) EO1 examines the dialled digits and determines that the dialled number (DN) relates to switch EO2 which is a donor EO (that is, some subscribers have been ported from this EO). Of course, carrying out this determination requires that every switch must perform an internal lookup to determine whether the DN is destined for a donor EO.

(2),(3) An LNP SCP database lookup is now performed to determine if the Called Party Number CdPN is ported. This lookup is done by sending an LNP query message to the SCP in the form a TCAP/SCCP Unitdata message. Typically, this query message will be routed via an STP as illustrated.

(4),(5) The SCP after performing an LNP database lookup returns an LNP response message, in the form of a TCAP/SCCP Unitdata message, containing the LRN found by the database lookup. If the customer has ported the LRN will be different from the original CdPN whereas for non-ported customers the LRN will be the same as the original CdPN (in this latter case, the response message could simply include a "not ported" indicator rather than any number).

(6),(7) The LNP response message tells EO1 whether the DN is for a ported customer and, if so, the LRN of the customer. Assuming the DN is for a ported customer, EO1 routes the call based on the LRN routing tables. The chosen route will generally be via an Access Tandem as the call is destined for a different carrier. Once a route is selected, switch EO1 prepares an IAM with the following substitutions: CdPN=LRN, GAP= DN and FCI=LNP Query Done. The IAM is then transmitted.

(8) When the IAM arrives at the recipient switch EO3, a check is performed on the FCI and GAP. In the present example, this check indicates that the IAM relates to a ported customer and so EO3 must substitute CdPN= GAP and then perform a lookup on the CdPN to establish the physical connection to the CPE (Customer Premises Equipment).

It will be appreciated that a switch-based implementation of the above LNP scheme requires significant modification to the switch software together with extensive validation testing of the modified software. In order to avoid this, our copending UK patent application no. 9604379.9 filed Feb. 26, 1996 proposes an LNP arrangement based on LRNs which is implemented by means of programmable message substitution units that are inserted into the signalling links and effect LNP lookups on any IAMs detected (unless such a lookup has already been done).

The introduction of LNP represents a major change for PSTNs since it breaks the traditional correlation between a dialled number and the geographical location (or at least network location) of the called party. Unfortunately, it is not only switches that are affected by this, but also any network element, such as an STP, that may need to effect SCCP message routing based on global titles. Thus considering again the case of a global title made up of a ten digit US telephone number, the final destination of the message concerned (for example, a switch) will no longer necessarily be given by the first six digits and it may be necessary to take all ten digits to identify the message destination. This obviously has a significant impact on the size of the translation tables needing to be kept by entities such as STPs and, of course, it requires modification to the related software.

It is an object of the present invention to obviate the need to upgrade STPs and other network elements effecting global title translation, in order to enable them to cope with the consequences of LNP.

SUMMARY OF THE INVENTION

According to one aspect of the present invention, there is provided a method of facilitating global title translation in a telecommunications signalling network supporting number portability for subscriber numbers; the signalling network comprising signalling links for carrying control messages between signalling end points at least some of which correspond to bearer-circuit switches, signalling transfer points for routing the control messages, and LNP resource means for providing for each ported subscriber number a routing number related to the actual network location of the ported subscriber number; said control messages including particular messages intended to be routed by said signalling transfer points in dependence on global title data held in each such message in the form of a subscriber number; said method comprising the steps of:

(a) intercepting said control messages on at least one link of the signalling network and selecting from the intercepted messages at least certain of said particular messages, (b) for each selected said particular message, determining by reference to said LNP resource means whether the subscriber number forming the global title of the message is a ported number, (c) where step (b) determines the global title to be a ported number, modifying the global title in dependence on the said routing number corresponding to the ported number forming the unmodified global title, and (d) forwarding on over the signalling network the said selected particular messages.

In relation to signalling system no.7, the particular messages are SCCP messages to be routed by global title.

Where a service to be implemented requires an SCCP message to be sent from an originating switch to a destination switch using a global title based on a subscriber number (for example, automatic call-back when free), then if the subscriber is a ported number the associated routing number upon the basis of which the global title is modified in step (c), will indicate the switch from which the subscriber currently depends.

Where a service to be implemented requires an SCCP message to be sent to a subscriber-information database resource covering an area including the current network location of the subscriber identified by the global title of the message, then if the subscriber number is a ported number the associated routing number upon the basis of which the global title in step (c), will indicate one of this database resource and a said signalling transfer point with knowledge of the location of this database resource.

Preferably, the LNP resource means includes for each ported number both a first routing number indicative of the switch from which the subscriber currently depends, and a second routing number for routing message to a subscriber-information database resource covering an area including the current network location of the subscriber, each said selected particular message including a type indicator and step (c) using said type indicator to determine which of the first and second routing numbers is to be used to modify the global title.

Advantageously, the unmodified global title of each said particular message is of a first length and the modified global title provided in step (c) is of a second length, shorter than said first length. In fact, step (c) preferably further involves shortening the global title of any said selected particular messages that do not relate to ported numbers to said second length. In this case, by arranging for a selection criterion against which said particular messages are selected in step (a) to be that the global title is of said first length, if a message has already been subjected to global title checking according to the method of the invention, it is not selected again for undergoing steps (b) and (c).

According to another aspect of the present invention, there is provided apparatus for facilitating global title translation in a telecommunications signalling network supporting number portability for subscriber numbers; said signalling network comprising signalling links for carrying control messages between signalling end points at least some of which correspond to bearer-circuit switches, signalling transfer points for routing the control messages, and LNP resource means for providing for each ported subscriber number a routing number related to the actual network location of the ported subscriber number; said control messages including particular messages intended to be routed by said signalling transfer points in dependence on global title data held in each such message in the form of a subscriber number; said apparatus comprising:

intercept means for intercepting said control messages on at least one link of the signalling network, selection means for selecting from the messages intercepted by said intercept means at least certain of said particular messages, determining means for determining, for each selected said particular message, whether the subscriber number forming the global title of the message is a ported number, global-title modifying means responsive to said determining means determining that a global title is a ported number, to modify the global title in dependence on the said routing number corresponding to the ported number forming the unmodified global title, and means for forwarding on over the signalling network the said selected particular messages.

BRIEF DESCRIPTION OF THE DRAWINGS

Methods embodying the invention of performing global title translation in a telecommunications signalling network supporting number portability will now be described, by way of non-limiting example, with reference to the accompanying diagrammatic drawings, in which.

BEST MODE FOR CARRYING OUT THE INVENTION

Figure 6:
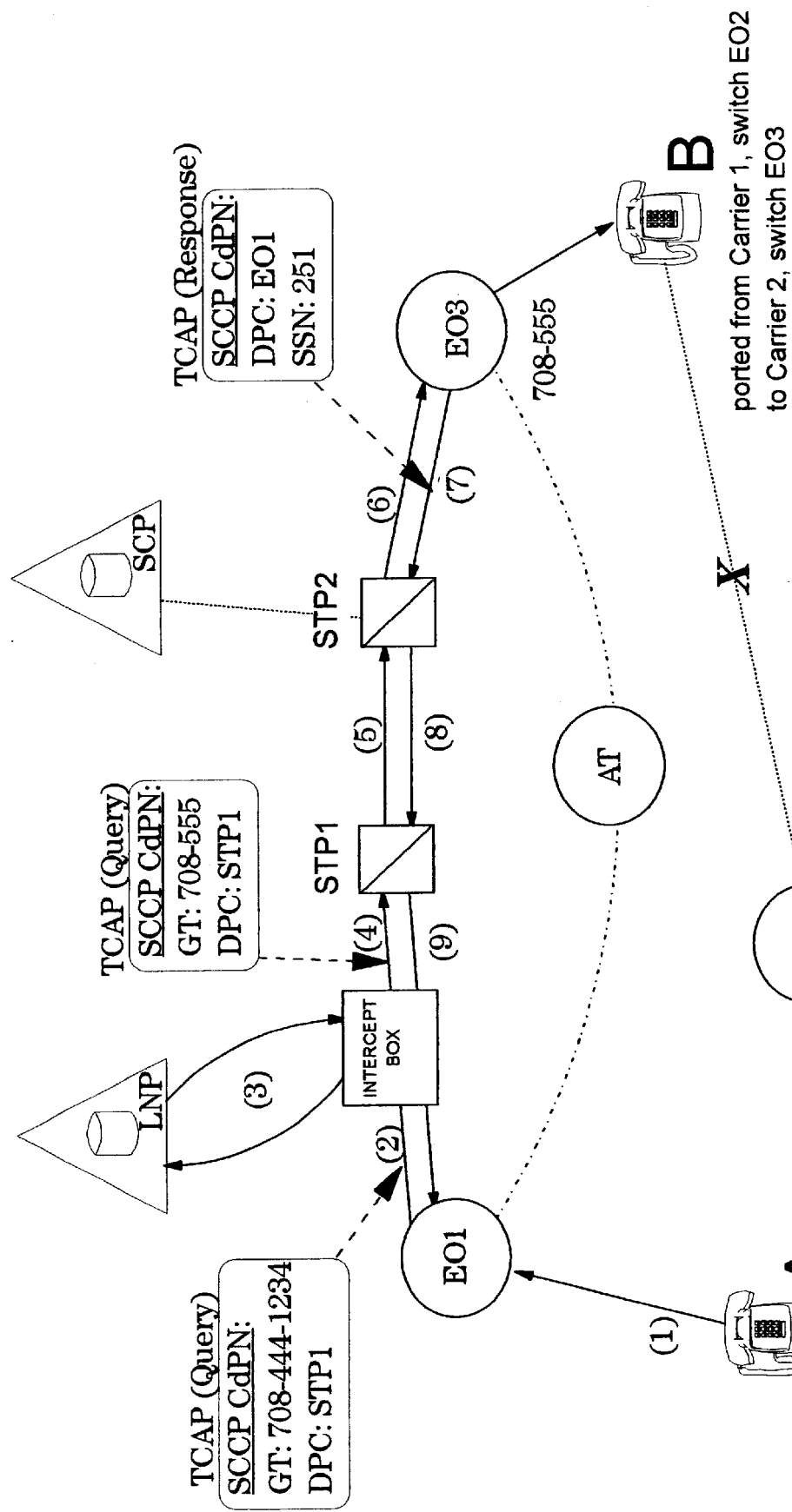
FIG. 6 is a diagram showing the operations involved in implementing a call-back when free service using global title translation in accordance with this invention and using a message interceptor.

A method according to the invention for effecting global title translation in a signalling system supporting LNP is described below, with reference to FIG. 6, in relation to a service, such as automatic call back when free, utilising subscriber-to-subscriber messaging between originating and terminating switches. The described method is implemented using a message interceptor disposed in an SS7 signalling link. The message interceptor: detects SCCP messages that are to routed according to their global titles; determines if the ten-digit subscriber number (for example) in the global title of such a message is a ported number and, if so, substitutes the first six digits of the corresponding LRN; and then forwards on the SCCP message. A suitable form of message interceptor is also described with reference to FIGS. 7 to 9.

Call-Back When Free Service Example

Figure 5:
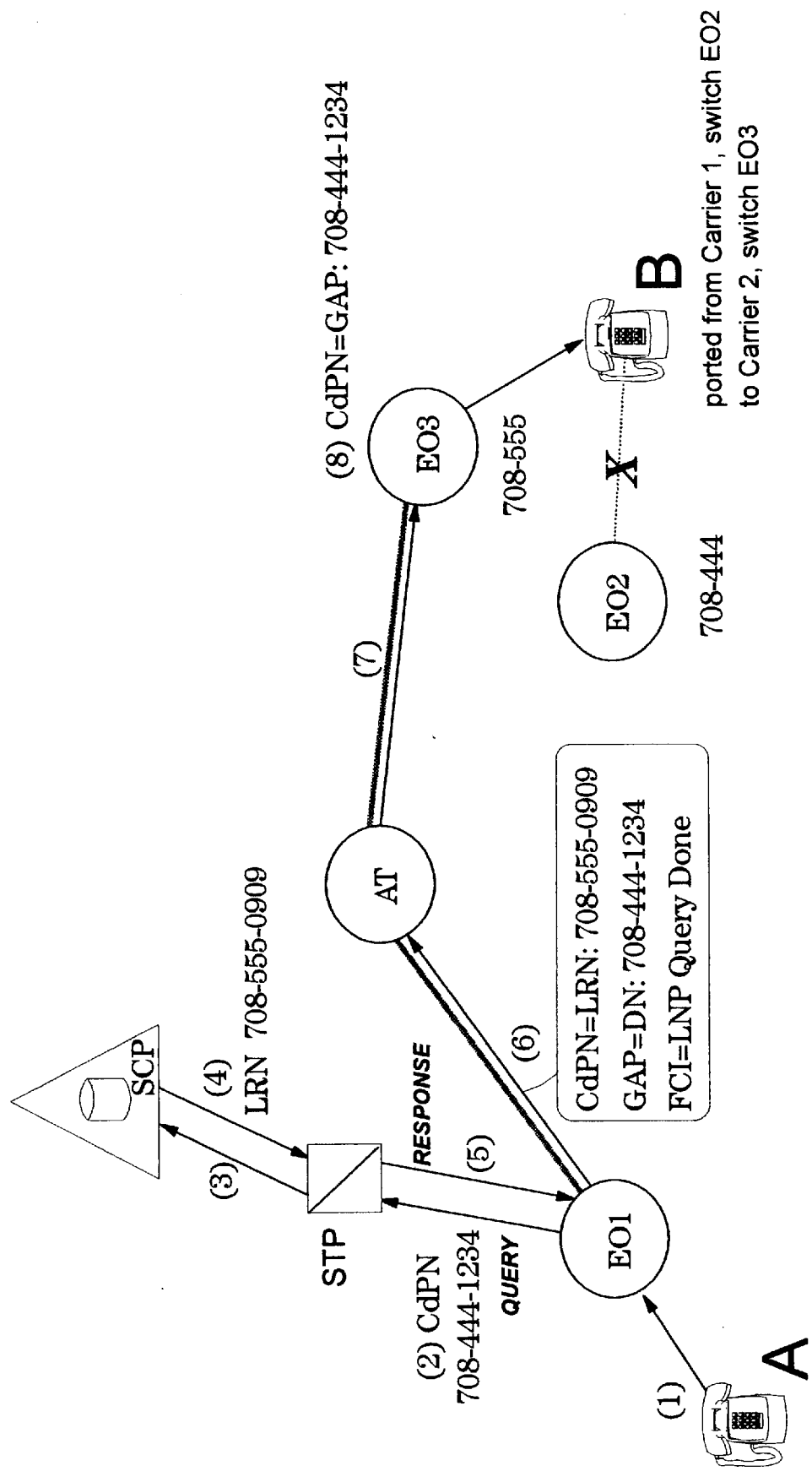
FIG. 5 is a diagram showing the operations involved in implementing the switch-based LRN number portability proposal described above.

The method of the invention will be illustrated by reference to the messaging associated with a call-back when free service in the same circumstances as described above with reference to FIG. 5, namely where a party A (EO1) is attempting to contact B who has now ported from carrier 1 (EO2) to carrier 2 (EO3). The attempted call setup including in particular how LNP is handled is, for example, dealt with in the same manner as described with reference to FIG. 5; alternatively, LNP may be implemented in some other way such as described in our above-referenced copending application. For present purposes, it is assumed that the attempted call set up through the access tandem AT has been unsuccessful because party B is already engaged on a call.

The operations that follow the dialing of "444-1234" when Party A invokes automatic callback will now be described, these operations being indicated by bracketed reference numbers in FIG. 6:

(1) EO1 examines the dialed digits.

Figure 1:
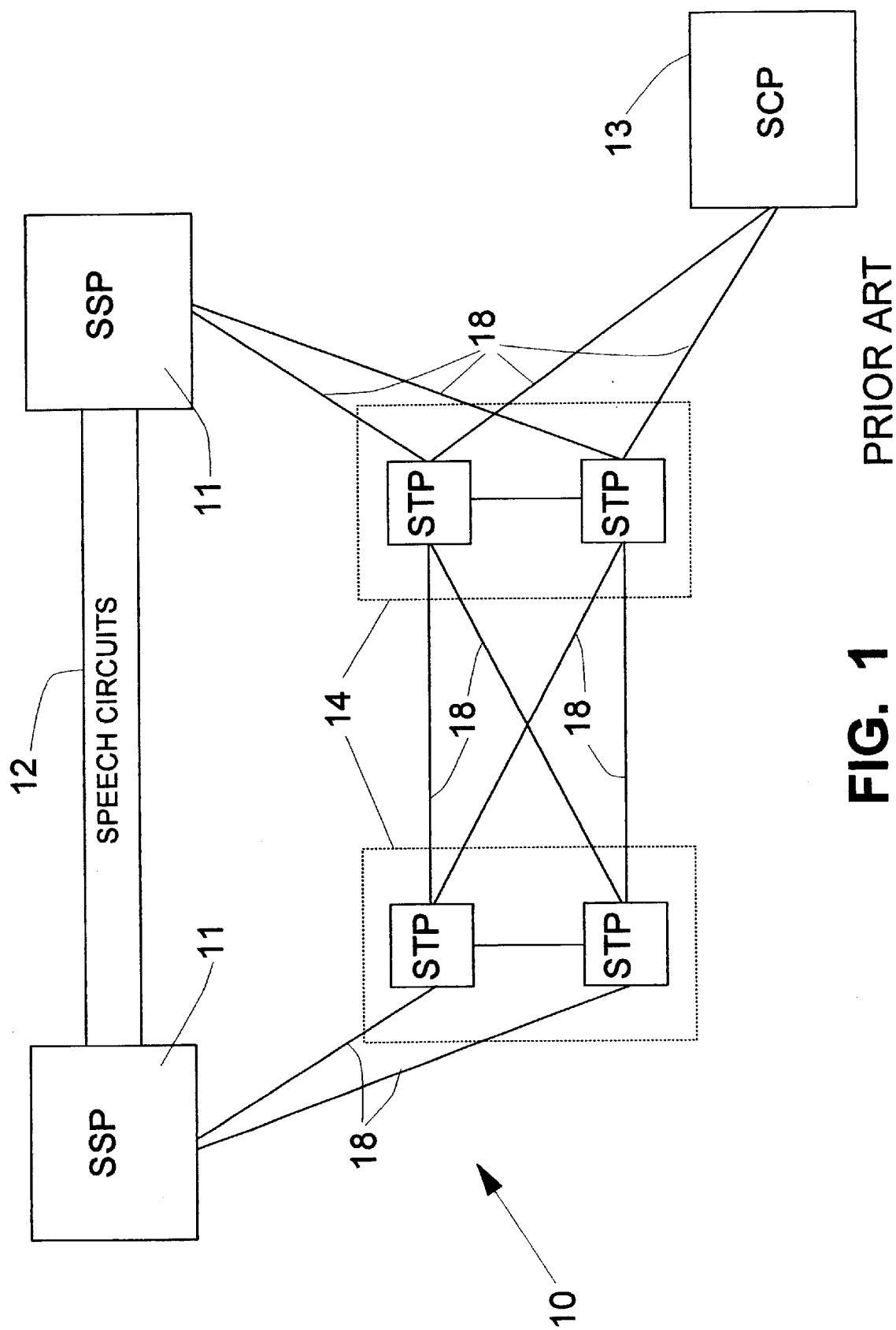
FIG. 1 is a diagram illustrating the main components of a standard SS7 signalling system.
Figure 2:
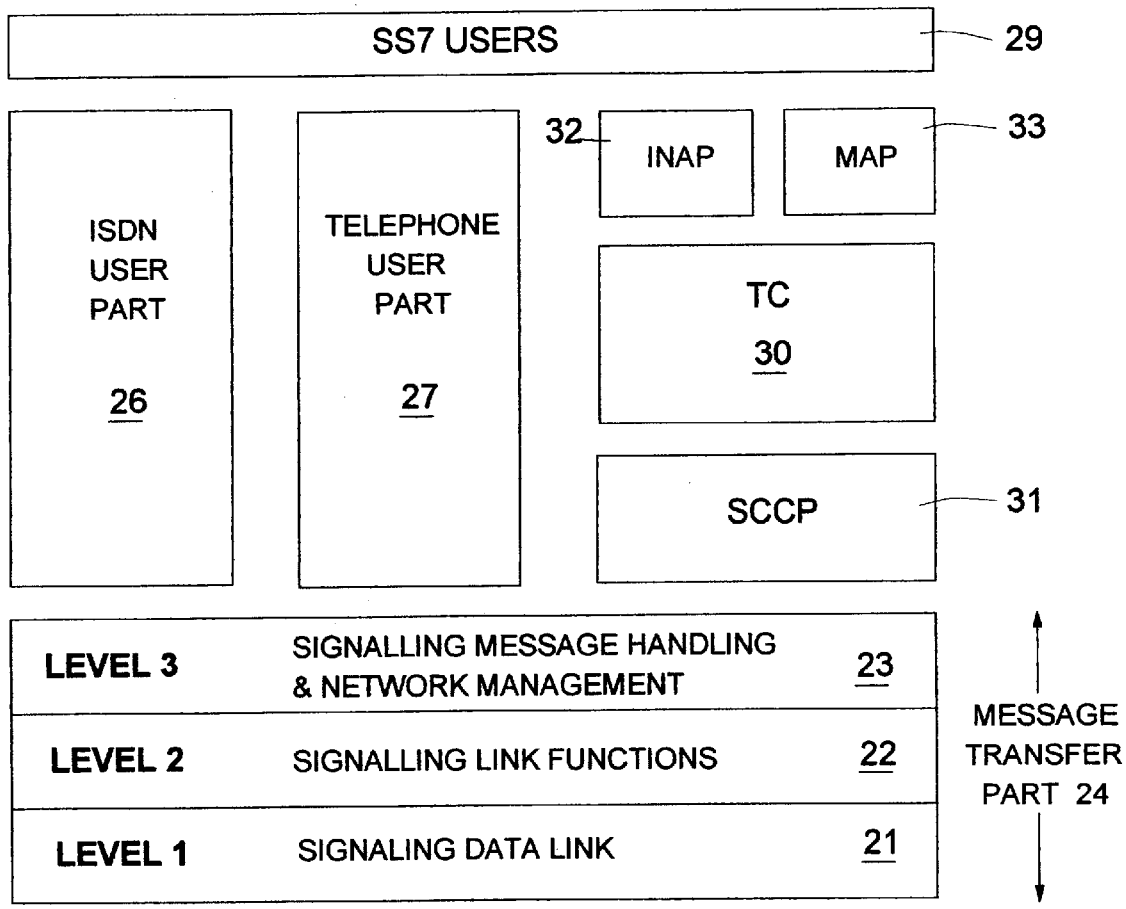
FIG. 2 is a diagram illustrating the basic architecture of the SS7 protocol.
Figure 3:
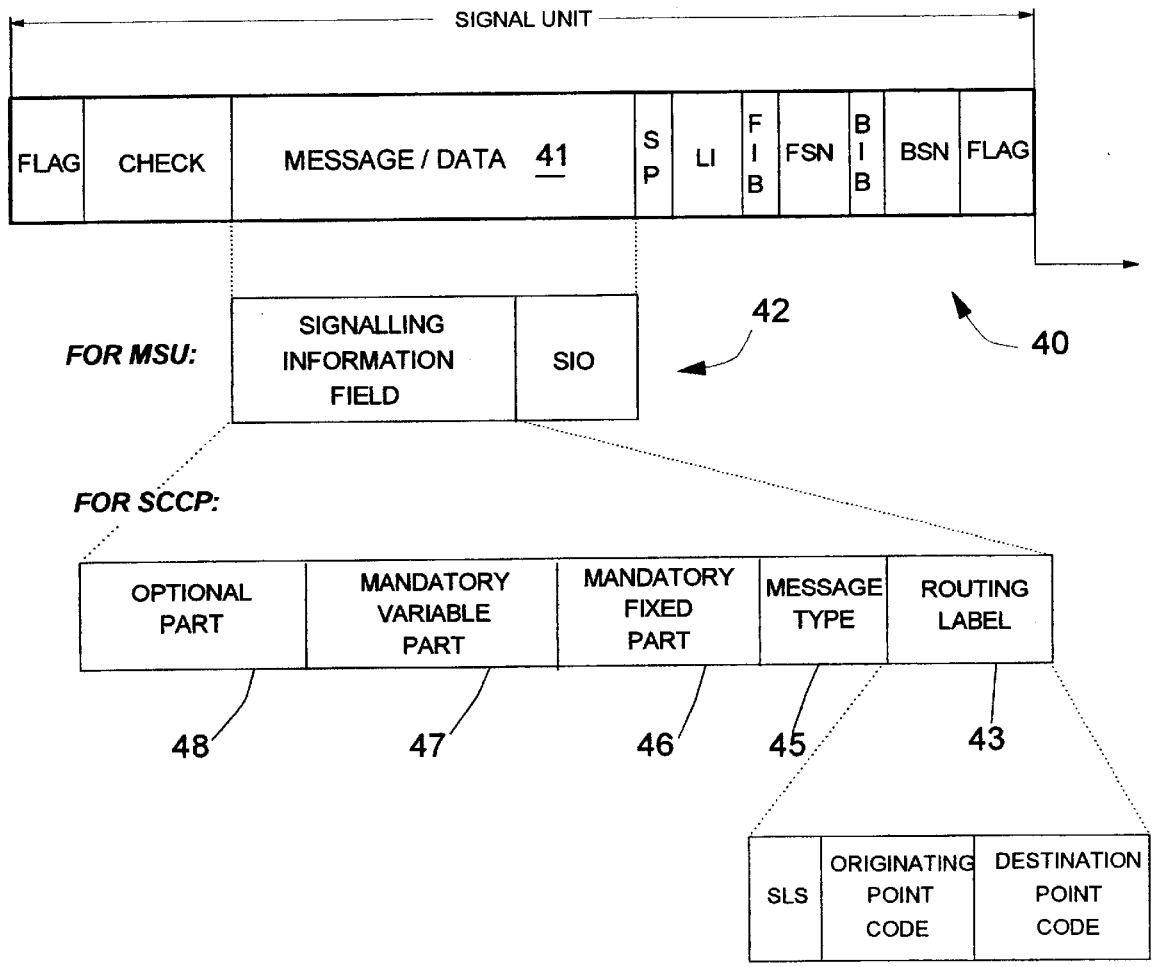
FIG. 3 is a diagram showing the format of an SS7 message signalling unit (MSU)
Figure 4:
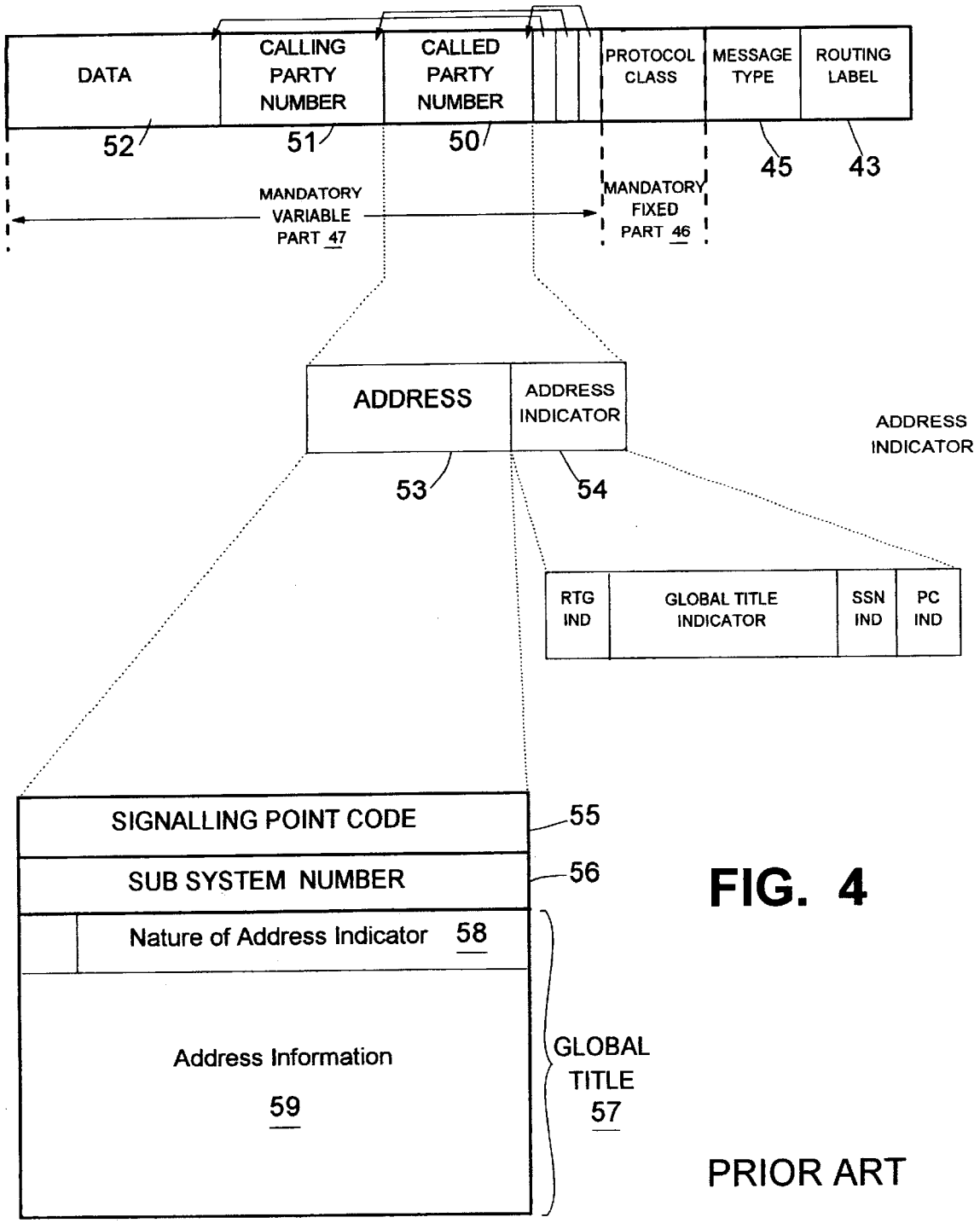
FIG. 4 is a diagram showing the format of a Unitdata SCCP message.

(2) EO1 determines that it needs to send a service request message to the switch handling party B and accordingly EO1 sends a message based on TCAP QRY message to that switch. This message utilises an SCCP Unitdata message to transport the TCAP data and includes B's full ten digit number (708-444-1234) in the global title, the routing indicator in the address indicator (see element 54 in FIG. 4) being set to indicate that routing is to be effected on the basis of global title information. The message is launched by EO1 towards STP1.

(3) A message interceptor intercepts the MSU traffic from the links between EO1 and STP1. This is done on a per-link basis. For each SCCP message detected, a check is made as to whether routing is to be effected on the basis of the global title, and if so, if the global title is of ten digit or six digit form. If the global title is of ten digit form, it is assumed that it has not already been processed to check for ported numbers whereas if the global title is only six digits, it is assumed that such processing has already been done. Only global-title routed SCCP messages with ten digit global titles are further processed, all other messages are simply forwarded by the message interceptor unchanged. For each of those messages to be further processed, an LNP database lookup is performed across a data network to determine if the subscriber number forming the global title is ported. Where the database lookup indicates that the number is a non-ported number, the message interceptor may truncate the global title to the first six to nine digits, as the remaining digits may have no routing significance. For ported numbers, the LNP database returns an LRN and the message interceptor substitutes the significant six digits of this LRN for the original global title. Thus, in the present example, the global title becomes 708-555.

(4)–(6) The message interceptor now sends out the TCAP/SCCP Unitdata message with its modified global title towards STP1. STP1 effects routing based on the global tide information by referencing its translation tables (based on six digits). STP1 routes the messages of interest towards STP2 which in turn routes the message to switch EO3, the appropriate final destination for the message.

(7)–(9) EO3 notes the request for automatic call-back when free in relation to party B, B's unported number (708-444-1234) having been included in the TCAP data requesting the service. EO3 then sends a TCAP response message back to EO1; this time routing is done on the basis of DPC and SSN, the DPC corresponding to the OPC included in the TCAP query. The route taken by the response message is illustrated as being the same as for the query message though this is not necessarily the case. The message interceptor does not concern itself with the TCAP response message as it is routed by DPC+SSN rather than global title.

From the foregoing, it can be seen that the intervention of the message interceptor to modify global titles based on ported numbers, enables the STPs to handle global title translation using existing lookup tables based on six digits.

The foregoing example relates to a service involving subscriber-to-subscriber messaging between originating and terminating switches. For other services, it may be required to address a TCAP query to a central carrier-specific database to interrogate particular subscriber details such as credit limit. The request may be launched from the carrier's own network or a remote network (for example, in respect of a credit card call made in network X using a credit card from network Y). Before the advent of LNP, the calling party's own telephone number could in some instances be used as a direct guide as to the home network of that party; a database query could then be launched either towards the subscriber database of that network (for example, directly if the database's point-code was known, or via a gateway STP for the relevant network, this STP being capable of recognising the query as one destined for the subscriber database and forwarding it appropriately). The introduction of LNP means that an LNP association must be made on the calling party's own number; thus, the TCAP query could include the calling party's own number as the global title (ten digits) and it would then be up to the STPs to translate this global title to direct the message appropriately, even in the case of ported numbers. To achieve this, the STPs would need translation tables based on ten digits. This can again be avoided by using the global-title translating message interceptor; in this case the message interceptor would detect global-title routed SCCP messages relating to database queries, do an LNP lookup and if the number were a ported one, modify the global title appropriately. The STPs could then continue to operate on six digits rather than ten digits. In fact, the message interceptor could be arranged, in respect of all global-title routed database queries, to modify the global title such that the query is directed to a gateway STP for the appropriate network, it then being the responsibility of the STP to recognise the query type and direct it to the subscriber database concerned. With this latter arrangement, the message interceptor is performing a rather different type of translation to that involved when simply replacing the original subscriber-number global title with the corresponding LRN—the new global title is no longer subscriber related but network gateway related. It is therefore possible that the same message interceptor may be required to effect different types of message translation in dependence on TCAP query type and in this case, the query type must, of course, be inspected before carrying out the translation.

The Message Interceptor

The message interceptor can be of the general form described in EP-A-0 669 771 in which a signalling link is effectively split into two links by the interceptor, the interceptor operating independent link-level protocol engines for exchanges with the two ends of the interrupted link. A message interceptor of this form whilst effective, is relatively complicated. A simpler form of message interceptor will now be described below with reference to FIGS. 7, 8 and 9.

Figure 7:
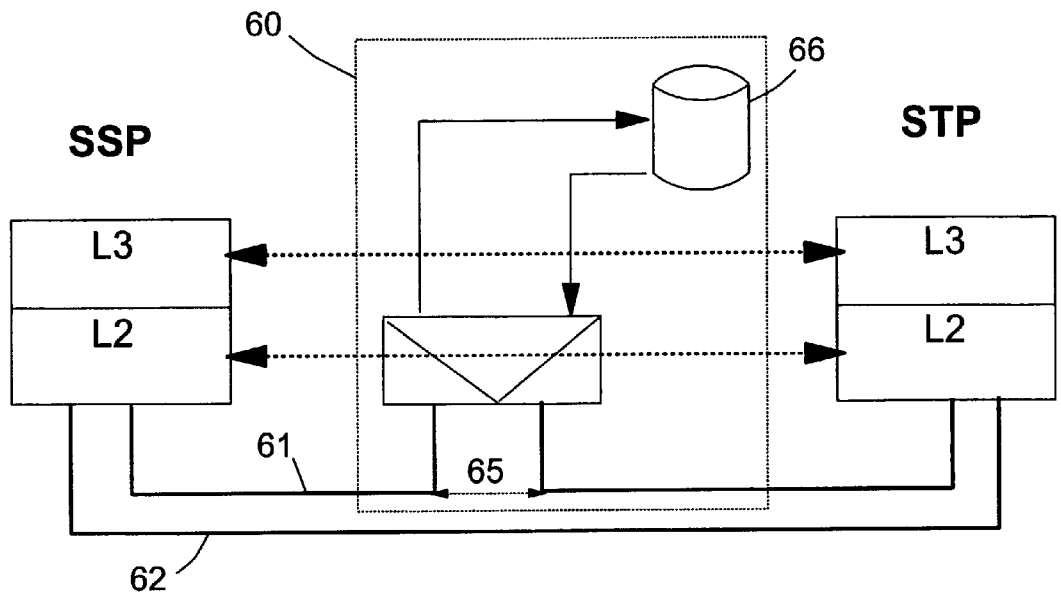
FIG. 7 is a diagram showing the operational placement of the message interceptor.

FIG. 7 illustrates the general disposition of a message interceptor 60 in one channel 61 of a bi-directional link between an SSP and an STP, this channel 61 passing messages from the SSP to the STP. Messages on the channel 61 are routed through the message interceptor 60 and in effect enter a delay pipe subjecting them to a delay $T_{pmsu}$ (see FIG. 8 which depicts both a message P flowing from SSP to STP along the channel 61 and a return message Q flowing in the opposite direction on the channel 62 which does not pass through the interceptor 60 so there is no delay $T_{pmsu}$ in this channel).

Figure 8:
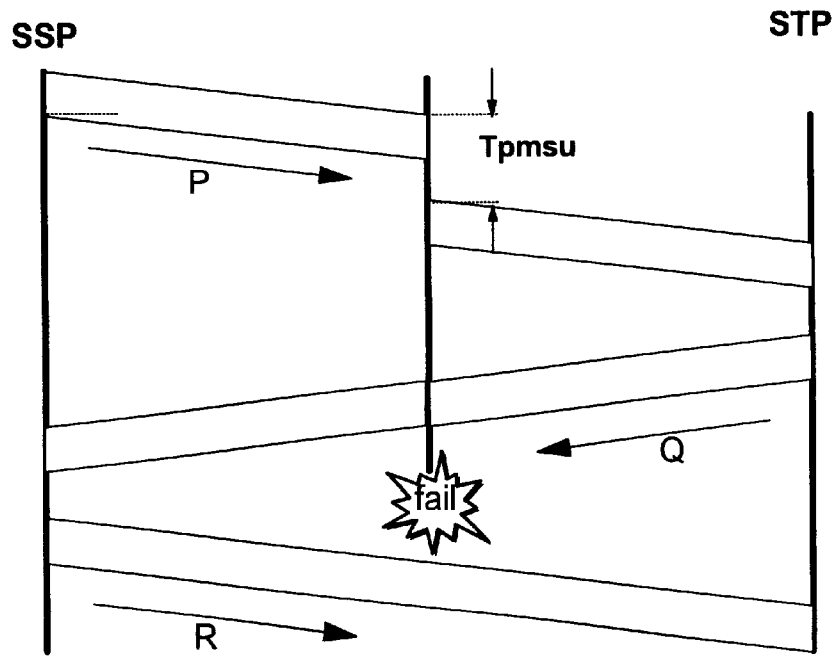
FIG. 8 is a time diagram illustrating the delay $T_{pmsu}$ introduced by the message interceptor.

A bypass relay arrangement 65 permits the interceptor 60 to be bypassed in fault conditions and in this case there will, of course, be no delay $T_{pmsu}$ in messages passing along the channel 61 (see message R in FIG. 8).

A key feature of the message interceptor 60 is that it does not modify MTP Level 2 state-based protocol procedures viz. backward error correction and flow control; it may, however, modify error checking and delimitation procedures which are stateless transformations.

The act of switching the relay arrangement 65 to bypass the interceptor 60 in the event of failure will be seen as bit errors which are corrected by Level 2 backward error correction procedures in the STP and SSP. Thus the SSP and STP will generally remain in synchronism in the event of failure of the interceptor 60.

During normal operation of the message interceptor, as each message passes through the interceptor it is examined by comparing its type and possibly the values of particular parameters with trigger condition data held by the message interceptor to see if the message is a global-title routed SCCP message (generally a TCAP query message) which the message interceptor is intended to process. If the message interceptor is triggered to respond, it will take appropriate action to modify the global title data, such as by effecting an LNP database lookup in a database 66, possibly on an external server (though where appropriate a local cache memory may be provided of sufficient size to hold the database). Once new global title data are derived, they are inserted in the message concerned and the message is then forwarded.

Figure 9:
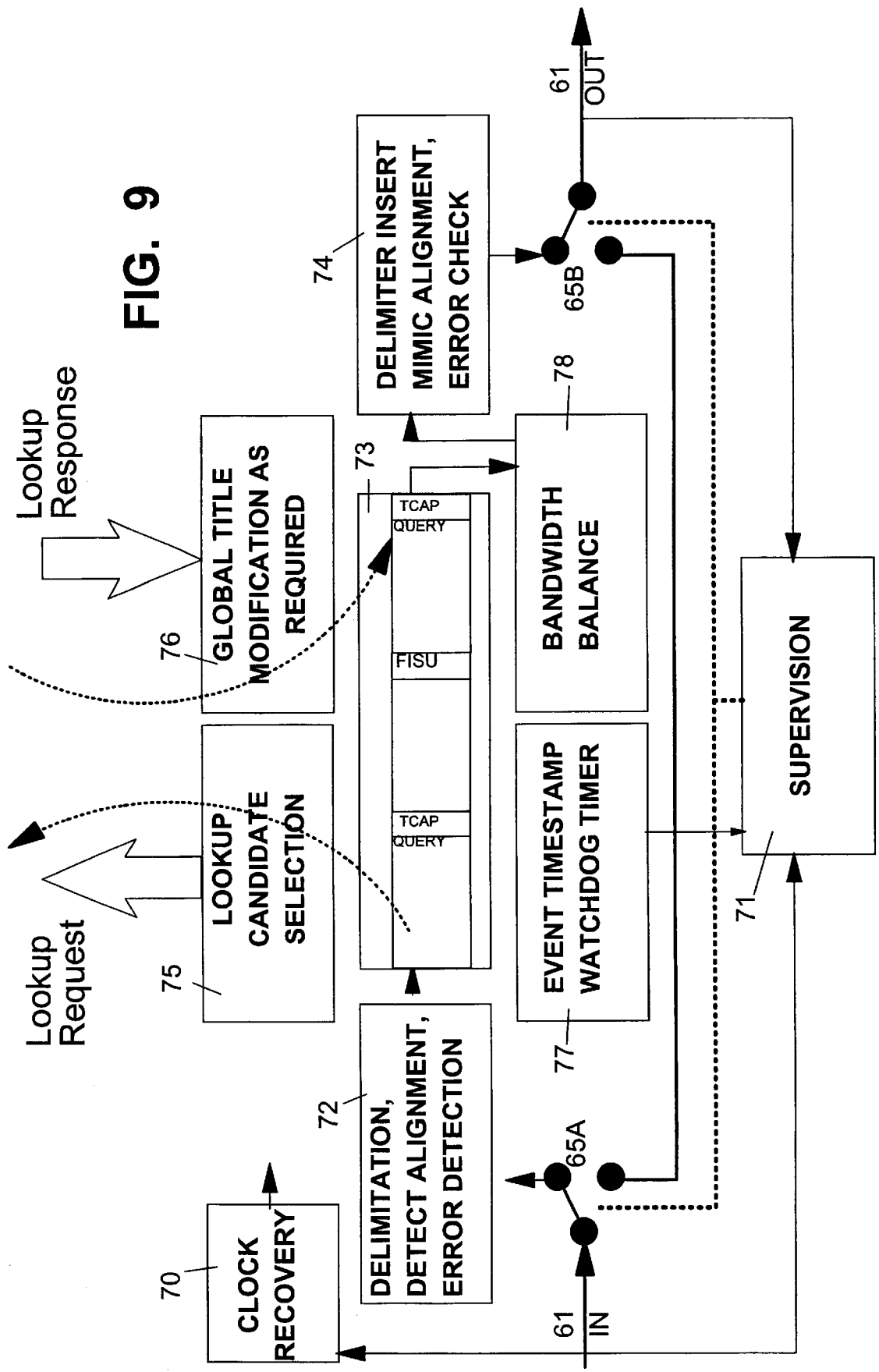
FIG. 9 is a block diagram showing the main functional units of the message interceptor.

FIG. 9 is a functional block diagram of the message interceptor 60. The message interceptor comprises the following units:

Relays 65A, 65B These are the bypass (or pass-thru) relays for bypassing the interceptor when non-operational. The relays are controlled by a supervision unit 71 (see below).

Clock recovery unit 70 This unit recovers clocking information from the line 61 to synchronise operation of the units of the interceptor (in particular, units 72 and 74) with the line 61.

Delimitation, alignment detection and error detection (receive) unit 72 This unit serves to read in messages from the line 61-in; to this end, the unit 72 carries out the following functions:

acquires MTP L2 message frames de-limited by flags and strips bits inserted for data transparency;

checks the frame meets MTP L2 criteria for frame length and that the CRC-16 check is correct; such frames are tagged as 'good';

traffic which fails the above criteria is tagged as 'errored';

in either case traffic is appended to a delay pipe 73 (see below) an octet at a time.

Delay Pipe 73 As already indicated, the intercepted messages are effectively passed through a delay pipe; in practice, this "pipe" is implemented by storing the messages in known memory locations and using pointers to provide a delay pipe type function.

Delimiter insert, mimic alignment and error check insert (transmit) unit 74 This unit serves to output messages from the delay pipe 73 onto the line 61-out; to this end, the unit 74 carries out the following functions:

delimits frames with flags;

inserts stuffed bits for data transparency;

calculates the CRC-16 check for the frame; appends the CRC-16 check to frames tagged as 'good'; appends the ones complement of the CRC-16 check to frames tagged as bad;

tracks the alignment of the receiver; if an event occurred which caused the receiver to enter octet counting mode (long frame, abort, short frame) then it is replicated by the transmitter.

Timestamping Unit 77 Message frames are timestamped on receipt of the first octet, the timestamp register is driven by the recovered clock information from the unit 70. A watchdog timer checks if the timestamp register is running and instructs the supervision unit 71 (see below) to place the relays 65A, 65B in pass-thru (bypass) mode if no clock is found.

Lookup candidate selection unit 75 This unit has TCAP/SCCP knowledge to allow it to detect particular message types (notably, but without limitation, Unitdata messages carrying TCAP queries) and to extract the parameter values of interest (notably, but without limitation, called party numbers holding global titles). Thus, in relation to the FIG. 6 example, upon the unit 75 detecting a 'call-back when free' TCAP query with a 10 digit global title, it will initiate a lookup in the database 66 (FIG. 7) against the extracted global title as soon as the latter is available. Lookups can be distributed between servers e.g. by using the first digit of a local number to decide which server to use. Fault tolerant lookups are also feasible by effecting multicast lookup to primary and secondary servers. Lookups may be transmitted via a LAN to a server or may be directed to a cache on board the interceptor. Only messages tagged as good are examined by the unit 75, those tagged as bad being passed through the interceptor unchanged.

Substitute lookup responses Unit 76 This unit effects any required modification to the global title of a message. Such modification may cause the message frame length to change and it is then the responsibility of the unit 76 to make any required adjustments to the length indicators and to the messages' internal pointers.

Bandwidth balance Unit 78 This unit checks if the timestamp of the frame at the head of the delay pipe was received at a time interval $T_{pmsu}$ (the pipe delay constant) before the time currently shown in the timestamp register. Let us call this difference $T_{diff}$. The unit 78 endeavours to keep the delay through the interceptor as constant as possible to prevent excessive jittering of the link throughput which could make queuing delays at the STP erratic and subsequent modelling difficult. The unit 78 operates according to the following rules:

if the difference is equal to or slightly greater than $T_{pmsu}$ then the frame is passed to the transmit unit 74;

if the difference is significantly larger than $T_{pmsu}$ then the delay pipe has grown owing to an increase in length of the preceding frame which in turn was caused by a lookup substitution. Several strategies are available to recover bandwidth and these are applied in the following order:

1. Use gaps between frames: if the time difference between the timestamps of the first and second messages (frames) in the queue is greater than the time it would take to transmit the first message in the queue, then the first message is passed to the transmit chain. The net effect on the link is a delay in receiving the message equal to the time it took to transmit the octets added to the previous message.

2. Delete a FISU: if there is a FISU at the head of the queue then it can be deleted without being transmitted, without affecting L3 data flow, because all the following conditions hold:
   (a) FISUs don't transfer L3 data;
   (b) the FSN information is only significant for MSUs;
   (c) the FIB indication is only significant for MSUs;
   (d) the BSN acknowledgement is caught by the BSN of the next frame;
   (e) the BIB indication is replicated in the BIB of the next frame; and
   (f) a frame must be following (thus guaranteeing (d) and (e)), because strategy 1 above failed.

3. Delete FISU and shift back: if an FISU can be found in the queue then it can be deleted according to the procedure above. The timestamps of all frames which precede the deleted FISU should be incremented by the time it would take to transmit the FISU.

4. Delete an MSU: by deleting an MSU at the head of the queue bandwidth for the preceding frame will be allocated. The MTP flow control procedure at the STP side of the message interceptor will then detect a missing sequence number and request re-transmission.

Supervision unit 71 This unit monitors both the incoming and outgoing streams and if any of the situations listed below occurs then the relays 65A, 65B are returned to pass-thru mode:

1. Error conditions are not passed through
2. Frames experience a delay significantly less than or greater than $T_{pmsu}$
3. A sequence of two or more frames arriving on the incoming stream has two or more frames deleted on the outgoing stream
4. A message encoding rule has been broken on the traffic on the outgoing stream
5. An excessive number of re-transmitted frames is received on the incoming stream. (This may be due to a hardware failure in the transmitter so the unit should be taken out of service as a precautionary measure)

It will be appreciated that the part of the message interceptor responsible for message input and output, the delay pipe, service trigger checking, and message modification, can be replicated and arranged in parallel to provide protection of the link during board swaps etc. The message modification portion of the interceptor may be replicated by itself with the replicated portions being arranged in parallel to increase modification throughput.

The message interceptor 60 is described in further detail in our copending UK patent application no. 96 15 998.3.

Variants

It will be appreciated that many variants are possible to the above described embodiments. Furthermore, although the above description relates to an SS7 signalling network, it will be appreciated that the message interceptor and the method of the invention could be arranged to operate with other, similar, signalling networks. In particular, it is possible to vary the physical and link levels from those generally specified for an SS7 network. Thus the message interceptor and method of the invention may be applied to a signalling network in which the basic link transport mechanism is based on ATM technology, the higher levels still being SS7 conformant.

We claim:

1. A method of facilitating global title translation in a telecommunications signalling network supporting local number portability (LNP) for each subscriber number determined to be ported; said signalling network comprising signalling links for carrying control messages between signalling end points at least some of which correspond to bearer-circuit switches, signalling transfer points for routing the control messages, and LNP resource means for providing for each said subscriber number determined to be ported, a routing number related to an actual network location of said subscriber number determined to be ported; said control messages including particular messages intended to be routed by said signalling transfer points in dependence on global title data held in each such particular message in the form of a subscriber number; said method comprising the steps of:

(a) intercepting said control messages on at least one of said signalling links of the signalling network and selecting from the intercepted messages certain of said particular messages, (b) for each selected one of said particular messages, determining by reference to said LNP resource means whether the subscriber number forming the global title data of the particular message is a ported number, (c) where step (b) determines the subscriber number to be a ported number, modifying the global title data through use of said routing number corresponding to the ported number forming the global title data received with the particular message, and (d) forwarding on over the signalling network, after said modifying thereof said selected particular messages.

2. A method according to claim 1, wherein one said selected particular message is intended to be routed to the switch from which the subscriber identified by the global title data currently depends, said routing number used to modify the global title data in step (c) indicating said switch.

3. A method according to claim 1, wherein one said selected particular message is intended to be routed to a subscriber-information database resource covering an area including the current network location of the subscriber identified by the global title data of the message, said routing number used to modify the global title data in step (c) indicating one of this database resource and a signalling transfer point with knowledge of the location of this database resource.

4. A method according to claim 1, wherein said LNP resource means includes for each said ported number both a first routing number indicative of the switch from which the subscriber currently depends, and a second routing number for routing messages to a subscriber-information database resource covering an area including the current network location of the subscriber, each said selected particular message including a type indicator and step (c) using said type indicator to determine which of said first and second routing numbers is to be used to modify the global title data.

5. A method according to claim 1, wherein unmodified global title data of said particular messages is of a first length and the modified global title data provided in step (c) is of a second length, shorter than said first length.

6. A method according to claim 5, wherein step (c) further involves shortening the global title data of any said selected particular messages that do not relate to ported numbers to said second length, and wherein in step (a) a selection criterion against which said particular messages are selected is that the global title data is of said first length whereby if a message has already been subjected to said method, it is not selected again for undergoing steps (b) and (c).

7. A method according to claim 1, wherein the passing of said control messages over said at least one signalling link of the signalling network is effected in accordance with a signalling link-level protocol having state, steps (a) and (d) being effected without affecting a current state of the signalling link-level protocol on the signalling link concerned.

8. A method according to claim 1, wherein the passing of said messages over said at least one signalling link of the signalling network is effected in accordance with a signalling link-level protocol having state, steps (a) and (d) being effected by setting up independent signalling link-level protocol exchanges with each end of the signalling link concerned whereby in step (a) said messages are intercepted by reception from one end of the signalling link in accordance with the signalling link-level protocol operated therewith, and in step (d) the messages are forwarded by transmission to the other end of the signalling link in accordance with the signalling link-level protocol operated therewith.

9. Apparatus for facilitating global title translation in a telecommunications signalling network supporting local number portability (LNP) for each subscriber number determined to be ported; said signalling network comprising signalling links for carrying control messages between signalling end points at least some of which correspond to bearer-circuit switches, signalling transfer points for routing the control messages, and LNP resource means for providing for each said subscriber number determined to be ported, a routing number related to an actual network location of the ported subscriber number; said control messages including particular messages intended to be routed by said signalling transfer points in dependence on global title data held in each such particular message in the form of a subscriber number; said apparatus comprising:

intercept means for intercepting said control messages on at least one of said signalling links of the signalling network, selection means for selecting from messages intercepted by said intercept means certain of said particular messages, determining means for determining, for each selected said particular message, whether a subscriber number forming the global title data of the particular message is a ported number, global title data modifying means responsive to said determining means determining that a subscriber number is a ported number, to modify the global title data through use of said routing number corresponding to the ported number forming the global title data as received with the particular message, and means for forwarding on over the signalling network the said selected particular messages, after modification thereof.

* * * * *